United States Patent [19]
Link et al.

[11] Patent Number: 5,715,921
[45] Date of Patent: Feb. 10, 1998

[54] FRICTION CLUTCH WITH AUXILIARY SPRING TO ASSIST THE RELEASE FORCE

[75] Inventors: Achim Link, Schweinfurt; Reinhold Weidinger, Unterspiesheim, both of Germany

[73] Assignee: Fichtel & Sachs AG, Schweinfurt, Germany

[21] Appl. No.: 579,064

[22] Filed: Dec. 22, 1995

[30] Foreign Application Priority Data

Dec. 24, 1994 [DE] Germany .......................... 44 46 755.9
May 17, 1995 [DE] Germany .......................... 195 18 065.8

[51] Int. Cl.$^6$ ........................ F16D 13/71; F16D 13/75
[52] U.S. Cl. ........................ 192/70.25; 192/89.23; 192/111 A
[58] Field of Search ............. 192/70.25, 89.23, 192/111 A

[56] References Cited

U.S. PATENT DOCUMENTS

| | | |
|---|---|---|
| 4,207,972 | 6/1980 | Zeidler ................ 192/111 A |
| 4,949,829 | 8/1990 | Tojima et al. ........ 192/89.23 |

FOREIGN PATENT DOCUMENTS

| | | | |
|---|---|---|---|
| 0944050 | 6/1956 | Germany . | |
| 3991022 | 8/1990 | Germany . | |
| 4-136525 | 5/1992 | Japan ................ 192/89.23 |
| 2261922 | 6/1993 | United Kingdom ... 192/111 A |
| 2273751 | 6/1994 | United Kingdom ... 192/111 A |
| 2278894 | 12/1994 | United Kingdom . | |
| 2287994 | 10/1995 | United Kingdom . | |
| WO 94/01692 | 1/1994 | WIPO ............... 192/111 A |

*Primary Examiner*—Richard M. Lorence
*Attorney, Agent, or Firm*—Nils H. Ljungman and Associates

[57] ABSTRACT

This invention relates to a friction clutch with a membrane spring in a pulled or pushed clutch, in which there is a second membrane spring/plate spring which assists the release force, and which, when the friction clutch is engaged, exerts little or no release force, and generates a release force which increases with increasing release travel.

19 Claims, 9 Drawing Sheets

FIG. 1
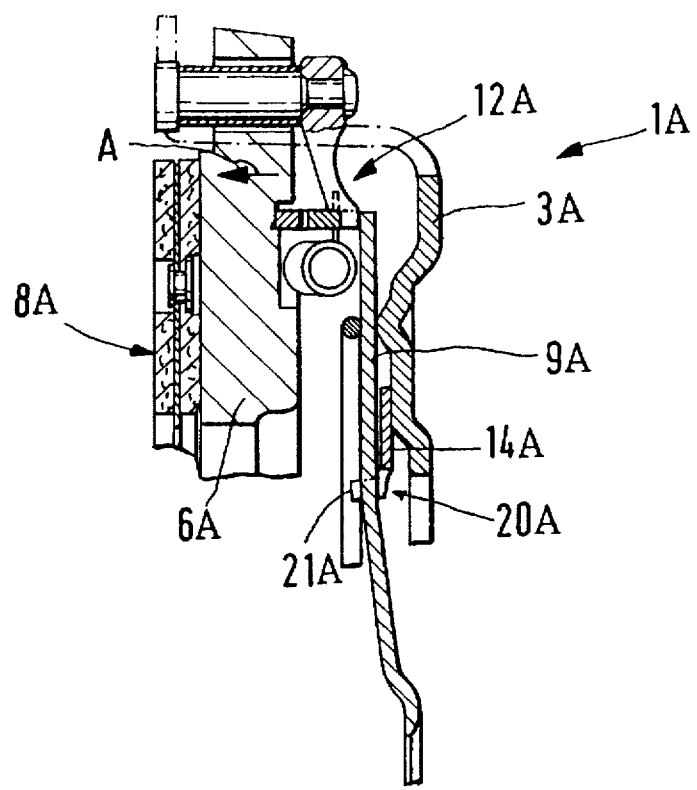
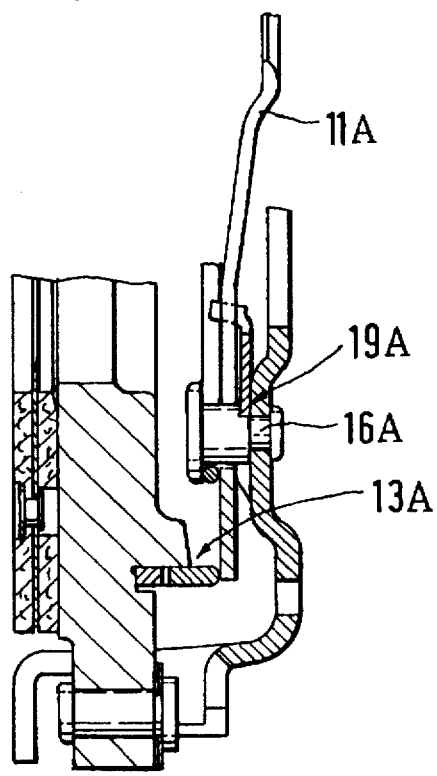

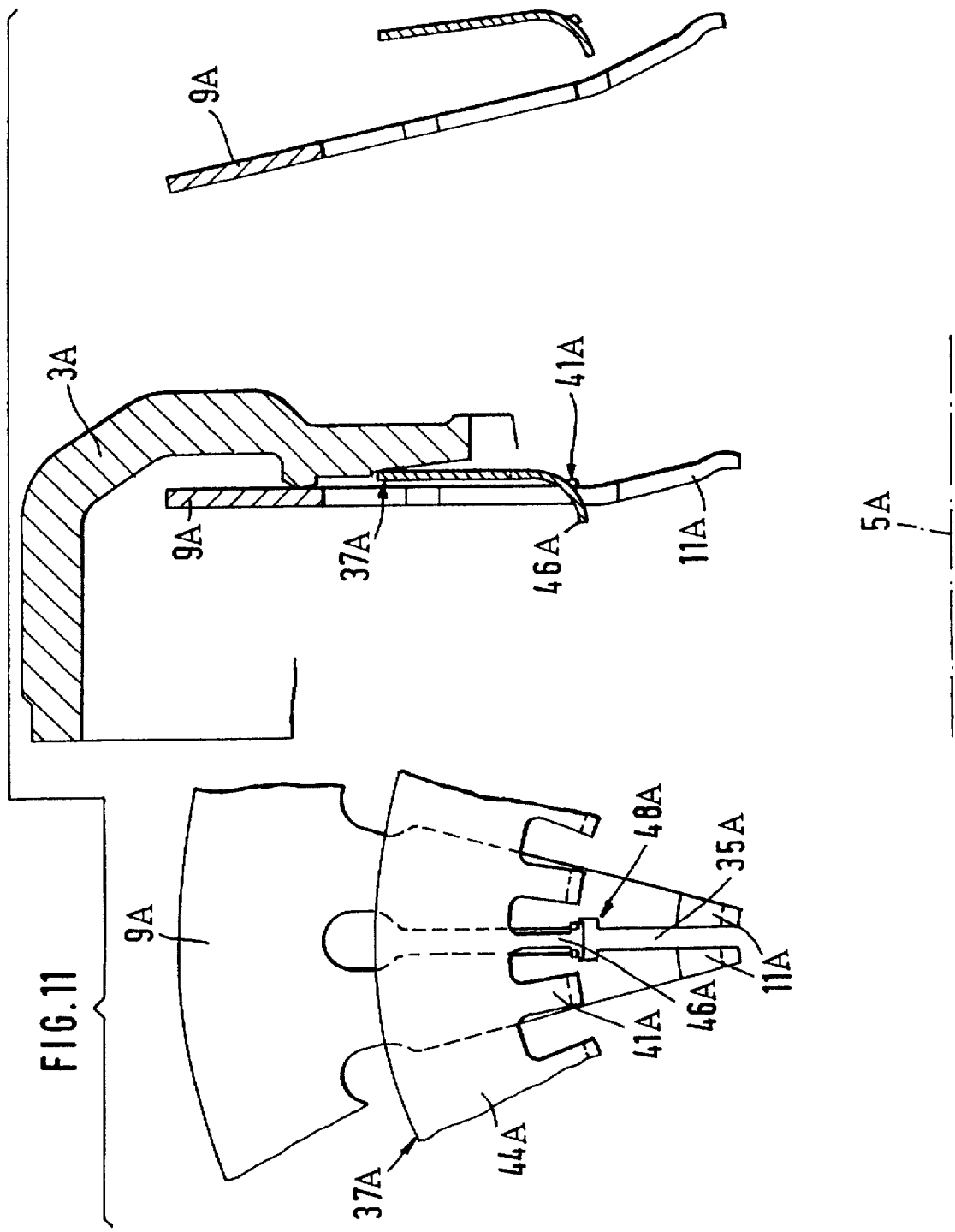

FRICTION CLUTCH WITH AUXILIARY SPRING TO ASSIST THE RELEASE FORCE

BACKGROUND OF THE INVENTION

1. Field of the Invention

The present invention relates to a friction clutch in the drive train of a motor vehicle, such a clutch comprising:

- a clutch housing which is fastened to a flywheel of an internal combustion engine and can rotate with the flywheel around an axis of rotation,
- an application plate which is fastened in the clutch housing non-rotationally but also fastened so that it can be displaced axially,
- a clutch disc with friction linings between the application plate and the flywheel,
- a membrane spring which is supported on one side on the application plate and on the other side on the clutch housing, and which membrane spring applies pressure to the application plate toward the flywheel to generate an application force A,
- a release element of a release system which acts on the radially inner areas of the membrane spring.

2. Background Information

German Patent 39 91 022 discloses a known membrane spring clutch which is provided with an additional spring element that makes an adjustment as the wear to the friction linings increases. The additional spring element opposes the spring force of the membrane spring. In this manner, when the friction linings of the clutch become worn, the increase of the spring force which is typical of a membrane clutch can be controlled so that the application force which is originated by the membrane spring remains essentially constant. This measure is usually incapable of reducing the actuation forces; it only usually ensures that the release forces do not increase.

German Patent 944 050 discloses a clutch actuation system in which an auxiliary spring can be used as a top dead center spring, via several intermediate levers and linkage points, so that there is a reduction of the actuation force as the actuation travel of the clutch pedal increases. This construction is quite complex and expensive, from the point of view of both manufacture and installation.

OBJECT OF THE INVENTION

An object of the present invention is to use the simplest possible means to reduce the actuation force in a membrane spring clutch.

SUMMARY OF THE INVENTION

The invention teaches that this object can be accomplished by means of the features disclosed hereinbelow.

As a result of a device for the automatic adjustment to compensate for wear to the friction linings, on one hand, the installed position of the membrane spring and thus the application force produced by it can be preserved, and, on the other hand, as a result of the presence of a membrane spring/plate spring, which is supported, on one side, on a fixed or axially fixed component and, on the other side, on another component in the actuation system consisting of the application plate and release system, and which, when the friction clutch is engaged, exerts little or no release force, but which force increases with increasing release travel, the invention teaches that it is possible to achieve an optimal correspondence between the characteristic of the membrane spring/plate spring and the characteristic of the membrane spring, so that an effective reduction of the actuation force in the range of release travel becomes possible. Thus the membrane spring/plate spring can be located at any point in the overall actuation mechanism.

The invention also teaches that the release force exerted by the membrane spring/plate spring is preferably, at no point of the release travel, greater than the force exerted by the membrane spring on the release system. It can thereby be ensured that a return force of the membrane spring is preserved over the entire range of the release distance (and thus over the total range of the actuation distance), and that the clutch pedal can be returned to the engaged position without any external assistance.

In one particularly advantageous embodiment of the invention, the membrane spring/plate spring is supported, on one side, on the clutch housing, and, on the other side, directly on the membrane spring. Such a construction permits an optimal coordination, or balancing, of the springs as early as during the manufacture and assembly of the friction clutch, without having to take into consideration the influences of the lever translation ratios in the actuator system.

The invention also teaches that the membrane spring/plate spring is preferably located essentially radially inside the radially inner support of the membrane spring. Theoretically, of course, the membrane spring/plate spring can also be located radially outside, but such a location generally requires more extensive adaptation measures, e.g. on the clutch housing.

The membrane spring/plate spring is preferably supported, in the vicinity of its two contact points, in the direction of the force exerted by the membrane spring/plate spring, and is also secured in the opposite direction. This arrangement ensures that given the inevitable divergences which occur when the springs are manufactured in large numbers, the membrane spring/plate spring is protected, even under unfavorable conditions, against snapping into the opposite direction when engaged. During the next release process, it is thus forcibly moved back into its actuation position.

On a friction clutch in the form of a pushed clutch with adjustment elements of the automatic wear compensation device located between the application plate and the membrane spring, the invention teaches that the membrane spring/plate spring can be engaged, by means of its outside diameter, in recesses of the spacer bolts which have a gap equal to at least the thickness of the material of the membrane spring/plate spring. In this construction, therefore, the spacer bolts which are already present can thus be used to provide guidance of the membrane spring/plate spring in the direction which is opposite to the direction in which the force is normally exerted.

The membrane spring/plate spring is also preferably supported, in its radially inner area, by means of a contact area on the flexible tabs of the membrane springs, and at least some of the flexible tabs are surrounded by separate or integral retaining elements to provide protection in the opposite direction. The membrane spring/plate spring is thus in contact, by means of its own contact force, both with the inside of the clutch housing and also with the flexible tabs of the membrane spring, and is protected against snapping into the opposite direction because it is, on one hand, supported on the spacer bolts and, on the other hand, surrounds at least some of the flexible tabs.

On a pulled clutch with adjustment elements of the device for automatic wear compensation located between the membrane spring and the application plate, the invention teaches that the membrane spring/plate spring can be engaged, by means of its outside diameter, in a housing gap which is at least equal to the thickness of the material of the membrane spring/plate spring, and that the membrane spring/plate spring is provided, in its radially inner area, with at least a few tabs distributed on the circumference, each of which runs through spaces between the flexible tabs of the membrane spring, and is supported on the flexible tabs on the back side of the flexible tabs. The result is a particularly compact form, since the membrane spring/plate spring essentially extends radially inside the opening of the clutch housing. The tabs of the membrane spring/plate spring are thereby bent radially inward in a hook shape at some distance from the back side of the flexible tabs of the membrane spring, and are supported on the flexible tabs by means of an encircling support ring. Such a construction is simple, easy to assemble and install, and is operationally safe and reliable even at high speeds of rotation.

The membrane spring/plate spring is also preferably secured with respect to the outside of the flexible tabs by means of a contact area which is interrupted only by the tabs. Here, again, precautions are taken so that the membrane spring/plate spring cannot become ineffective as a result of snapping out of the specified position.

The housing gap can thereby advantageously be formed, on one hand, by the inner edge of the clutch housing minus the thickness of the material of the membrane spring/plate spring, and, on the other hand, by heads of securing rivets which are installed so that they project radially inward beyond the area of the reduced material thickness. Such a construction is simple in terms of both manufacture and assembly.

But it can also be advantageous to configure the spring force curve of the membrane spring/plate spring so that there is a crossover, and so that the release force is greater than the force exerted by the membrane spring. In such a case, the membrane spring can be forced back into its engaged position, e.g. by the automatic clutch actuation mechanism.

But it is also easily possible, by means of additional measures, to reduce the characteristic of the membrane spring in the terminal area of the release travel so that a crossover with the characteristic of the membrane spring is not possible. The invention teaches that the membrane spring can be in contact by means of its inside diameter with the flexible tabs of the membrane spring, and can be in contact in the vicinity of its outside diameter with the clutch housing, whereby the clutch housing can be realized so that, during the transition from the released state of the friction clutch to the engaged state, the point of contact between the membrane spring and the clutch housing moves from the outside diameter to an intermediate diameter which is smaller than the outside diameter. This simple measure ensures that, during the transition from the engaged state into the released state, the force curve of the membrane spring is severely flattened in the desired area, and a crossover cannot occur.

In one advantageous refinement of the teaching of the invention, the membrane spring can, by means of its inside diameter, be in contact with the flexible tabs of the membrane spring, and, by means of its outside diameter, in contact with the clutch housing. Further, when the friction clutch moves from the engaged position into the released position, the membrane spring can come into contact with the clutch housing by means of an intermediate diameter. Such a construction is particularly easy to manufacture if the membrane spring is fixed, on its outside diameter, by means of the spacer bolts which are located concentric to the axis of rotation, and if at least one of the spacer bolts has an extension pointing radially inward with which the membrane spring can come into contact during the release process.

In a friction clutch in which the membrane spring is actuated by means of a hydraulic/pneumatic release system which has an axially fixed housing and an axially movable piston with a release bearing, the membrane spring can particularly advantageously be placed in contact with the housing by means of the outside diameter of the membrane spring, and with the piston by means of the inside diameter of the membrane spring. Such a construction is particularly advantageous if, for whatever reason, it does not seem practical to install the membrane spring in the friction clutch itself.

BRIEF DESCRIPTION OF THE DRAWINGS

The invention is explained in greater detail below with reference to the several embodiments illustrated in the accompanying drawings.

FIG. 1A is a longitudinal section through a friction clutch;

FIGS. 10A and 11A are partial sections through the upper half of the friction clutch with variant springs.

DESCRIPTION OF THE PREFERRED EMBODIMENT

Figure 2:
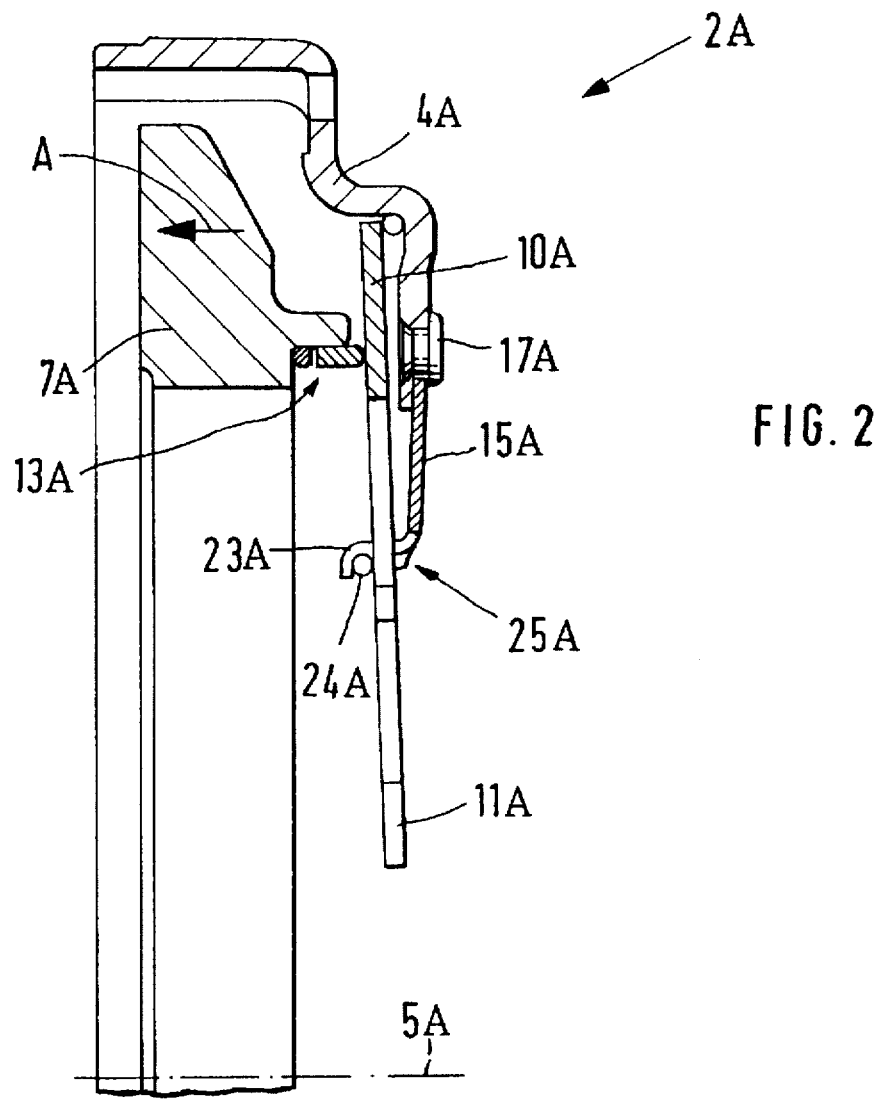
FIG. 2A is a longitudinal section through the upper half of an additional friction clutch.

FIG. 1A shows a friction clutch 1A, the basic design of which is conventional. For example, a clutch housing 3A is firmly fastened to a flywheel (not shown) of an internal combustion engine, and can rotate with the flywheel around the axis of rotation 5A. Inside the clutch housing 3A, a membrane spring 9A is supported. When the clutch is engaged, membrane spring 9A exerts an application force A on the application plate 6A, so that the clutch disc 8A, with its friction linings, is clamped between the flywheel and the application plate 6A with the application force A. The application plate 6A is thereby fastened, in a manner not shown, non-rotationally with respect to the clutch housing 3A, but so that it can be displaced axially with respect to the clutch housing 3A.

The friction clutch 1A is preferably realized in the form of a pushed clutch, which means that the membrane spring 9A is supported in the vicinity of its outside circumference on the application plate 6A, and in the vicinity of an intermediate diameter, is supported by means of a multiplicity of spacer bolts 16A distributed about the periphery of the clutch housing 3A. Toward the radial inside, the membrane spring 9A can be provided with a multiplicity of flexible tabs 11A distributed on the periphery, with which a release system (not shown) is engaged.

Between the outside diameter area of the membrane spring 9A and the application plate 6A, there is preferably a device 12A to automatically compensate for wear to the friction linings. Device 12A can include, among other things, adjustment elements 13A which, when the friction linings of the clutch disc 8A become worn, ensure that, in spite of the displacement of the application plate 6A in the direction indicated by the arrow A when wear occurs, the distance between the application plate and the radially outer area of the membrane spring 9A is increased as a function of the wear, so that the membrane spring 9A can exert a uniform application force A on the application plate 6A over the entire life of the friction linings of the clutch disc 8A. A more detailed description of the device 12A would not appear to be warranted, since device 12A can exist in one of several different embodiments, such as the one disclosed in Unexamined German Patent Application 35 18 781.

Also preferably located in the friction clutch 1A is a membrane spring/plate spring 14A which, in a manner to be described in more detail, effects a reduction of the release force which must be applied. This membrane spring/plate spring 14A is preferably designed and installed so that, in the illustrated engaged position of the friction clutch 1A, it exerts little or no release force on the membrane spring 9A. As the release movement (i.e. a movement of the flexible tabs 11A of the membrane spring 9A in the direction indicated by the arrow A or a motion of the radially outer edge of the membrane spring 9A in the opposite direction) increases, the membrane spring/plate spring 14A can preferably exert an increasing release force on the membrane spring 9A, so that the actuation forces for the friction clutch 1A can be significantly reduced.

Figure 4:
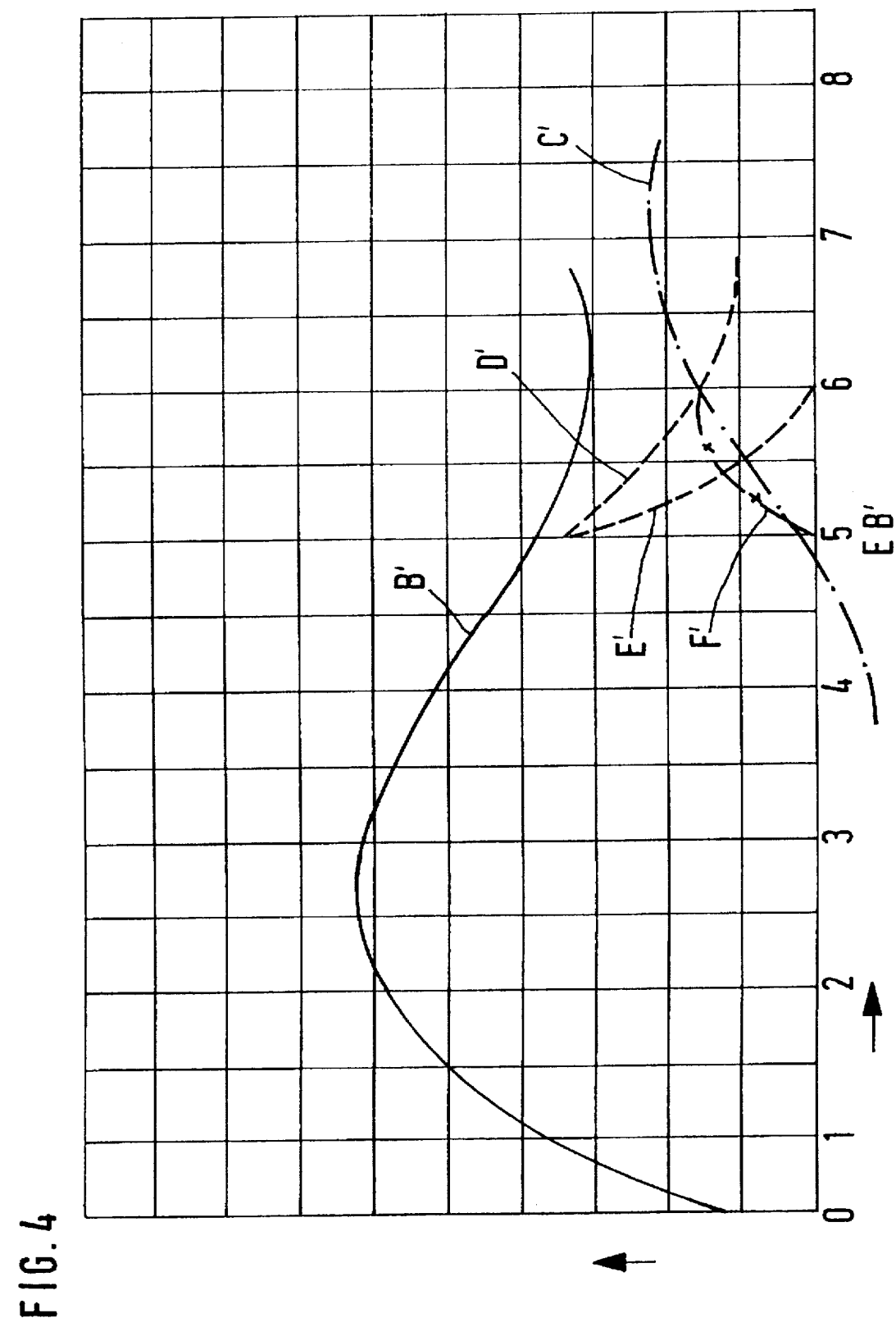
FIG. 4A shows the spring forces of the various components plotted over the spring travel.

In this context, FIG. 4A shows several spring characteristics plotted as a function of the spring travel. The characteristic B' corresponds to the membrane spring 9A, and shows the spring force over the spring travel. This is a typical membrane spring characteristic with an increase in the spring force in the range of small spring travel, and a decrease in the spring force with increasing spring travel. EB' indicates the original installed position of the membrane spring in the friction clutch under operating conditions with an engaged clutch. This installed position is kept constant by the device 12A.

The installed position is preferably selected so that the application force generated here by the membrane spring 9A produces the specified clamping force for the clutch disc, and to transmit the specified torque. The release movement essentially takes place from the installed position in the direction of increased spring travel.

In FIG. 4A, it can be assumed that the release movement takes place between the number 5 and approximately 6.7. In this region, the spring characteristic B' has already reached its minimum and then ascends slightly. The membrane spring/plate spring 14A which is designed to reduce the release force produces a spring characteristic C'. Spring characteristic C' can basically be identical to the path of the characteristic B', but can run in the opposite direction, and the spring 14A is preferably installed so that in the installed position, little or no release force is exerted on the membrane spring 9A. With increasing release motion, the force increases sharply as shown by spring characteristic C', and the actuation force to be applied by the release system to the flexible tabs 11A is reduced by the same amount. By subtraction of the characteristic C' from the characteristic B', the characteristic D' is achieved, which represents the force to be applied by the release system.

It should also be taken into consideration that elasticities may also provide some assistance. Such elasticities could be constituted, for example, by a clutch housing 3A which is not absolutely rigid and/or by some flexibility between the friction linings of the clutch disc 8A. For example, the spring characteristic E' can take into consideration the effect of the flexibility of the lining of the clutch disc 8A, which represents an opposing force to the spring characteristic B', and can thus be subtracted from the spring characteristic D' in the vicinity of its action between the installed position and the number 6, thereby producing the spring characteristic F'. This spring characteristic D' can be the actual release force to be applied by the release system or by the driver. The spring characteristic F', approximately in the vicinity of the number 6 of the spring travel, can make a transition into the spring characteristic D', and then run further downward with the latter.

It is clear that there is essentially a major difference between the spring characteristic D' of the membrane spring 9A and the spring characteristic F' which must be applied to release the friction clutch.

The friction clutch realized as shown in FIGS. 1A and 4A can be actuated with very low forces. In this regard, it should be noted that the balancing, or coordination, of the installed position of the membrane spring/plate spring 14A is preferably carried out in such a manner that, in the installed position, the membrane or plate spring 14A exerts the smallest possible release force, so that at this operating point, only a small load is applied to the membrane spring 9A. That is also shown in FIG. 4A, where the spring characteristics E' and D' begin somewhat below the spring characteristic B', and namely by the same amount by which, in this installed position E', B', the spring characteristic C' runs above the zero line of the spring force.

However, since there are natural divergences which inevitably occur when springs of this type are manufactured in large numbers, and the objective is to keep the crossover of the spring characteristic as close as possible to the original installed position, it is possible that spring combinations may occur in which the crossover of the spring characteristic C' can be displaced toward the right, i.e. in the direction of greater spring travel. In such a case, when the friction clutch 1A is engaged, the membrane spring/plate spring 14A would snap and become ineffective. For this purpose, as illustrated in FIG. 1A, the spring 14A is located so that it cannot snap into its inactive position, since in the vicinity of its radially outside and inside diameter it is interlocked, on one hand, with the flexible tabs 11A of the membrane spring 9A, and, on the other hand, with the housing 3A. For this purpose, the spring 14A, in the vicinity of its outside diameter, can be supported on a recess 19A which is formed between the inside of the clutch housing 3A and a corresponding edge of the individual spacer bolts 16A. The recess 19A essentially corresponds to the thickness of the material of the spring 14A. In the inside diameter of the spring 14A, the spring, as a result of its internal stress, is normally in contact, by means of an encircling support area 20A, with the outside of the flexible tabs 11A, and there are individual support elements 21A which can be realized separately or in one piece with the spring 14A, and which individual support elements 21A run through the gaps around the periphery between two flexible tabs 11A, and each of which individual support elements 21A surrounds a flexible tab. Thus, the spring 14A would essentially not be able to move into its inactive position, and during each release process, spring 14A would supply a release assistance force as a result of its increasing spring force.

FIG. 2A shows a section through the upper half of a pulled friction clutch 2A. In this case, the membrane spring 10A is supported in the vicinity of its outside diameter on the clutch housing 4A, and on a smaller diameter on the application plate 7A. The membrane spring 10A is extended radially inward in the form of individual flexible tabs 11A, with which a release system (not shown) is engaged. In the clutch housing 4A, the application plate 7A is guided non-rotationally but so that it can move axially, and an application force A is applied by the membrane spring 10A to clamp the clutch disc (not shown) between the application plate 7A and the flywheel (not shown). All the components of the friction clutch 2A can rotate with the flywheel around the axis of rotation.

Preferably located between the membrane spring 10A and the application plate 7A are adjustment elements 13A which are part of a wear compensation device, as described above in relation to FIG. 1A. In this case, for the release process, the flexible tabs 11A of the membrane spring 10A are pivoted to the right, in the direction opposite to the Arrow A. Further, the membrane spring/plate spring 15A which assists the release force is located so that its outside diameter is in contact with the clutch housing 4A. Additionally, membrane spring/plate spring 15A extends, in the vicinity of its inside diameter, by means of several tabs 23A which are distributed around the circumference on the back side of the flexible tabs 11A, where membrane spring/plate spring 15A is supported by means of a support ring 24A.

Figure 3:
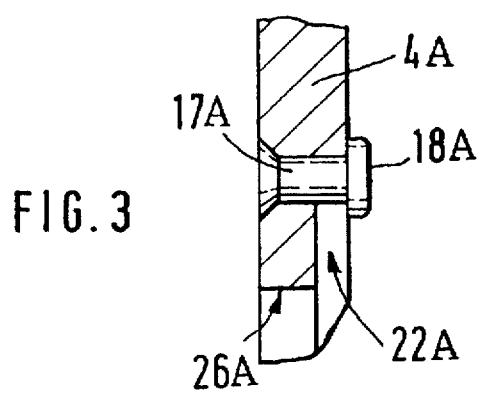
FIG. 3A is a detail of FIG. 2A.

The support on the back side of the membrane spring 10A is highly desirable because the spring 15A must exert a release force on the flexible tabs 11A, which release force is directed opposite to the direction indicated by the Arrow A. The opposing support force on the outside diameter of the spring 15A occurs on the clutch housing 4A in the vicinity of its inner edge 26A. At that point, the inner edge 26A of the clutch housing 4A has a material thickness which is reduced, namely from the outside, by the dimension of the material thickness of the spring 15A. The spring 15A is thereby likewise fixed in the opposite direction, namely by the heads 18A of securing rivets 17A which project radially inward to some extent on the clutch housing 4A, as shown in FIG. 3A. The spring 15A is also preferably fixed in the vicinity of its tabs 23A by means of a contact area 25A on the outside of the flexible tabs 11A.

The force relationships of the construction illustrated in FIGS. 2A and 3A can essentially be considered as being identical to the force relationships of the construction illustrated in FIG. 1A, and can thus essentially be derived from FIG. 4A. As the release travel increases, the spring 15A exerts an increasing force, corresponding to spring characteristic C', on the membrane spring 10A, namely in the direction of reducing the actuation force. It is thereby supported by means of its outside circumference against the inner edge 26A of the clutch housing 4A, and by means of its inside circumference against the tabs 23A and the support ring 24A on the back side of the flexible tabs 11A. Once again, to provide protection against snapping into the inactive position, on one hand, the securing rivets 17A are preferably attached on the clutch housing 4A with their heads 18A, and, on the other hand, there is preferably a contact area 25A on the front side of the flexible tabs 11A.

Figure 5:
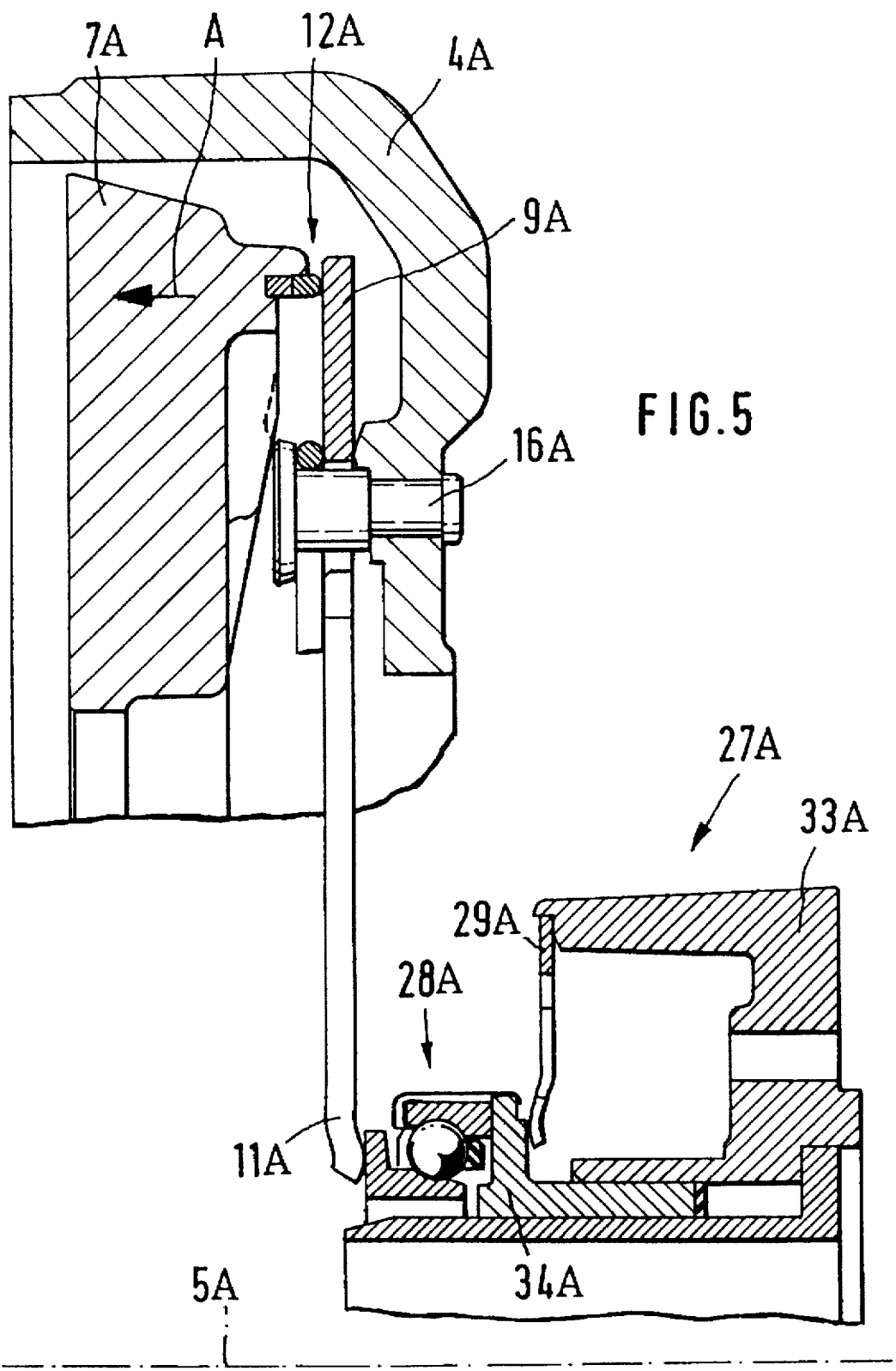
FIG. 5A is a longitudinal section through the upper half of a friction clutch when the spring is located in the release system.

FIG. 5A shows a friction clutch in which, in contrast to FIGS. 1A to 3A, the membrane spring/plate spring 29A is installed outside the friction clutch. In this case, the friction clutch can be actuated by a release system 27A which is powered pneumatically or hydraulically. The housing 33A is attached in a stationary manner, e.g. to the transmission housing, and has a piston 34A which, like the housing 33A, is concentric with respect to the axis of rotation 5A. The piston 34A preferably carries the release bearing 28A, which acts directly on the radially inner ends of the flexible tabs 11A of the membrane spring 9A. By pressurizing the space between the housing 33A and the piston 34A with a pressure medium, the piston 34 is capable of actuating the membrane spring 9A by means of the release bearing 28A.

The membrane spring/plate spring 29A is preferably located between the housing 33A and the piston 34A. The membrane spring/plate spring 29A is preferably supported preferably on the axially stationary housing 29A and acts on the membrane spring 9A by means of its release force via the release bearing 28A. In this construction, measures are taken so that the curve of the spring force of the membrane spring/plate spring 29A has a positive value in the area E', B' corresponding to the spring characteristic C', unless measures are taken as shown in FIGS. 1A and 2A to protect against snapping. With this construction, the spring 29A is located in the release system 27A, so that the corresponding space can be saved in the friction clutch itself.

Figure 6:
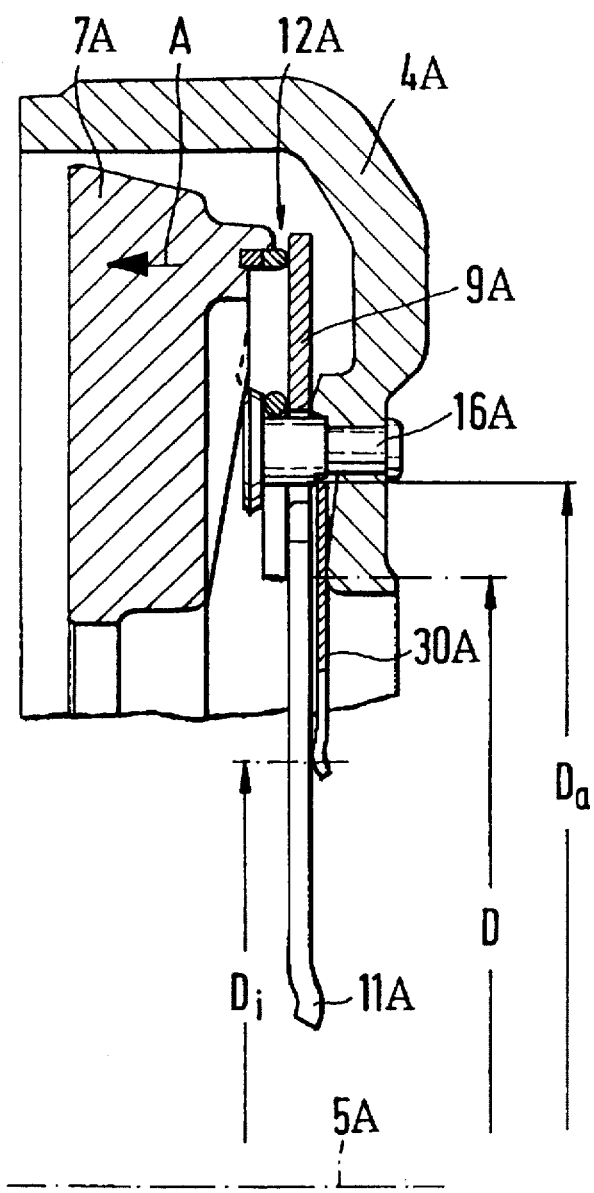
FIGS. 6A and 7A are longitudinal sections through the upper half of a friction clutch in the engaged state and in the released state.
Figure 7:
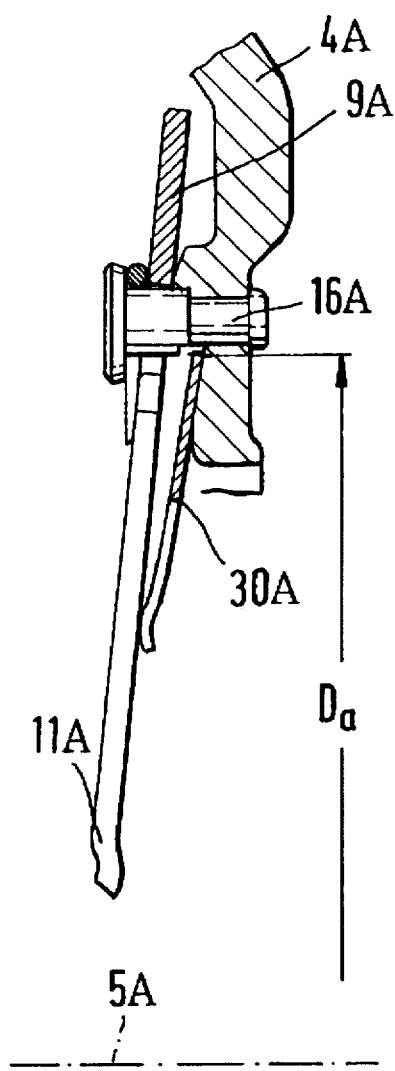

FIGS. 6A and 7A show the engaged and the disengaged state of a friction clutch, respectively. In a conventional manner, this friction clutch includes a clutch housing 4A with an application plate 7A which is axially movable and peripherally or radially stationary, and which is biased by a membrane spring 9A in the direction A. Between the application plate 7A and the membrane spring 9A, there is a device 12A as described above which makes adjustments to compensate for wear.

The membrane spring 9A is preferably mounted in the clutch housing, in a conventional manner, by means of spacer bolts 16A which are oriented concentric to the axis of rotation 5A, whereby the spacer bolts 16A specify the tipping circle or arc, or sweep circle or arc, during the actuation of the clutch. Located radially inside the spacer bolts 16A between the clutch housing 4A and the membrane spring 9A is a membrane spring 30A, which basically acts in the manner described above by means of its inside diameter $D_i$ on the outside of the flexible tabs 11A of the membrane spring 9A, and is supported in the vicinity of its outside diameter on the clutch housing. The membrane spring 30A is thereby centered in the radial direction by the spacer bolts 16A.

Figure 8:
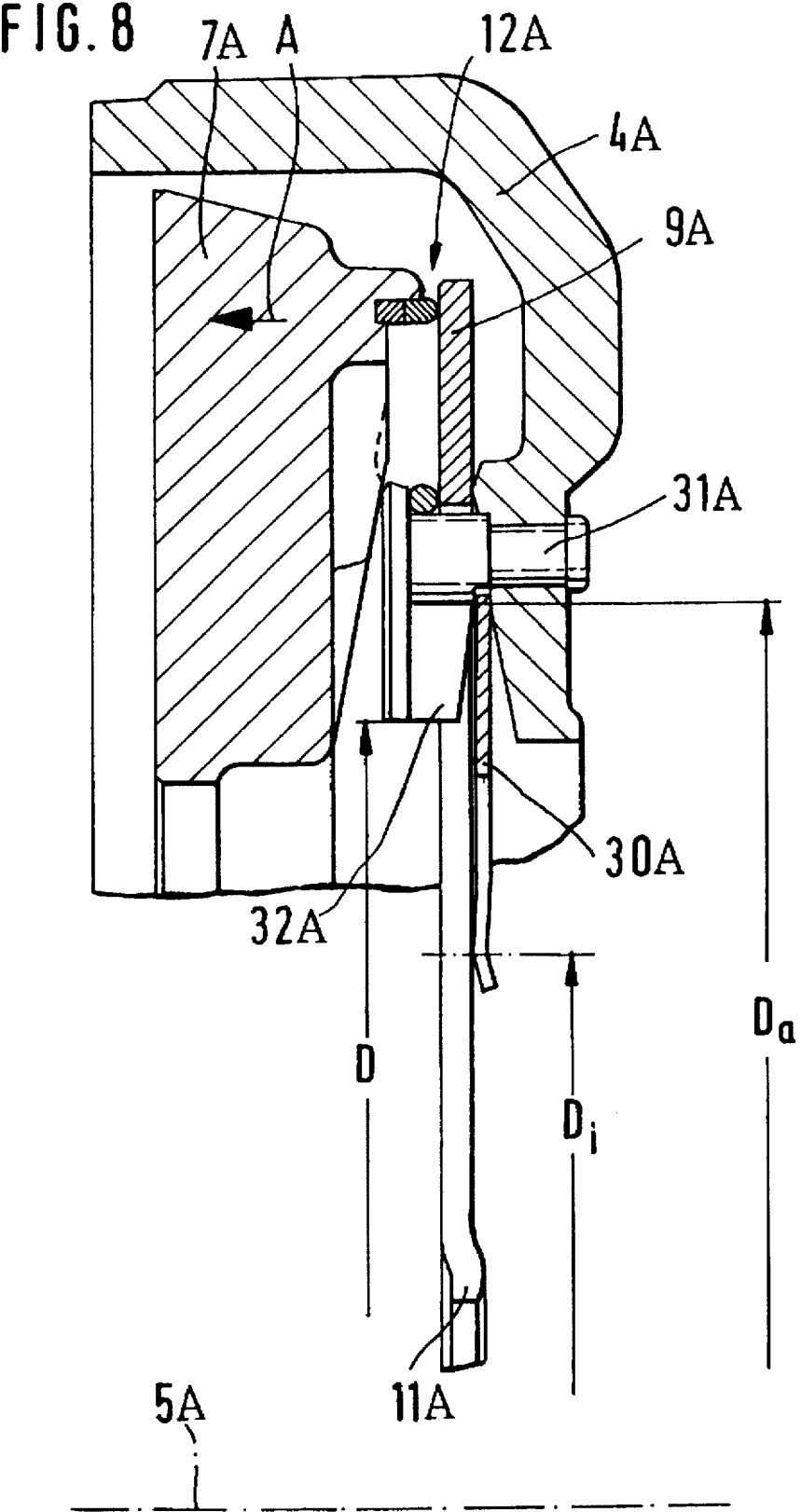
FIG. 8A is a longitudinal section through the upper half of an additional friction clutch.
Figure 9:
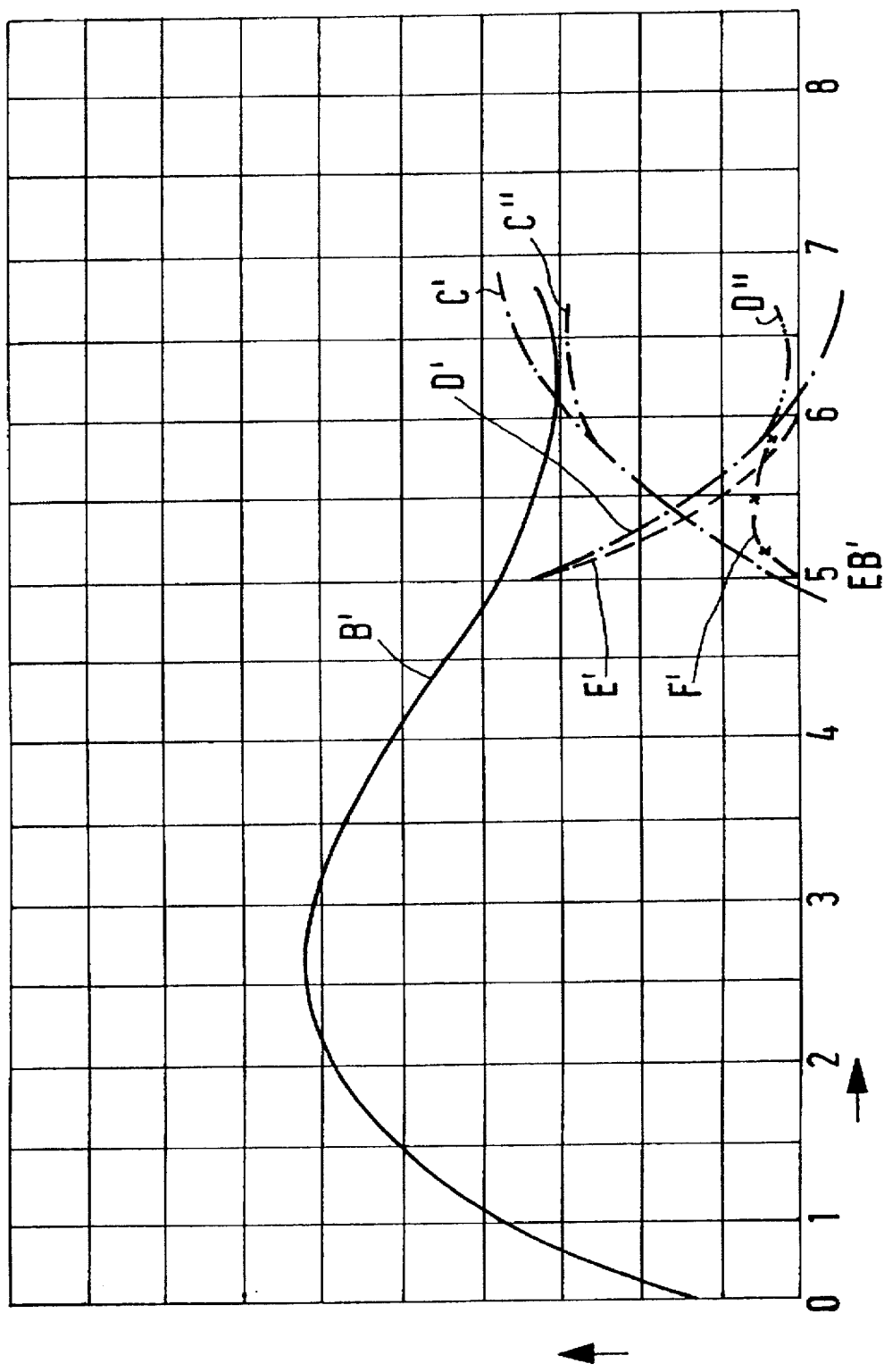
FIG. 9A illustrates the spring forces plotted over the spring travel, as shown in FIGS. 5A to 8A.

In the area between the outside diameter $D_a$ of the membrane spring 30A and an intermediate diameter D' (which is smaller than the outside diameter $D_a$) there is preferably a bevel in the clutch housing 4A, such that when the friction clutch is engaged as shown in FIG. 6A, the membrane spring is in contact by means of its diameter D' with the clutch housing 4A, and when the friction clutch is released as shown in FIG. 7A, is in contact by means of its outer diameter $D_a$. The following effect is achieved, as illustrated in FIG. 9A:

The spring characteristic B' corresponds to the spring characteristic illustrated in FIG. 4A. That is also true for the spring characteristic E' of the lining of the clutch disc. The curve of the spring characteristic C' is very steep in the area between the installed position E',B' and the position of the clutch disc in the released state, which results in a very low actuation force characteristic F'. Therefore, on one hand, there is a risk that when the friction clutch is released, the spring characteristic C' will run above the spring characteristic B' of the membrane spring 9A. Such a design can be used advantageously in an automatic clutch actuation in which the clutch actuator can exert force on the membrane spring in both directions of movement of the membrane spring (e.g. if it surrounds the membrane spring 9A). In this case, however, in spite of the retention of the steep spring characteristic C', by changing the point of contact from $D_a$ to D during the engagement process, it is ensured that, corresponding to the characteristic C", an intersection with the spring characteristic B' will be avoided. Thus the spring characteristic F'—starting from the installed position E', B'—changes into the curve of the spring characteristic D", and always remains in the positive area of the spring force. FIG. 8A illustrates another opportunity to influence the spring force curve C' of the membrane spring 30A so that, like C", it is severely flattened as the release travel increases, and thus prevents any intersection with the spring characteristic B'. The friction clutch of described in the previous embodiments is provided with a membrane spring 30A which is fixed in the radial direction by the spacer bolts 31A which are oriented concentric to the axis of rotation 5A. At least one of these spacer bolts 31A, on the side of the membrane spring 30A facing the application plate 7A, has an extension 32A which runs radially inward, and which, when the friction clutch is engaged, is at some distance from the membrane spring 30A. The illustration shows the engaged state, in which the membrane spring 30A is in contact with its outside diameter $D_a$ on the clutch housing 4A, and with its inside diameter $D_i$ on the flexible tabs 11A of the membrane spring 9A. If the friction clutch is then moved into the engaged state—by moving the flexible tabs 11A to the left—the membrane spring 30A, after executing a part of the release movement, comes into contact with the extension 32A, and from that point on, its action on the membrane spring 9A weakens. A spring characteristic corresponding to C" is thus achieved, and the release force remains in the positive range. The balancing, or coordination, of the characteristic curve can thereby be carried out by means of the contact diameter D and the distance between the extension 32A and the membrane spring 30A.

The measures described in FIGS. 6A to 9A to influence the spring characteristic of the membrane spring 30A can of course be transferred to a construction like the one illustrated in FIG. 5A. In this construction, too, it is possible to design the curve of the spring characteristic C' so that it is steep in its area near the installed position, which reduces the level of the release forces, and also to ensure that there is no crossover with the spring characteristic B' of the membrane spring 9A.

Figure 10:
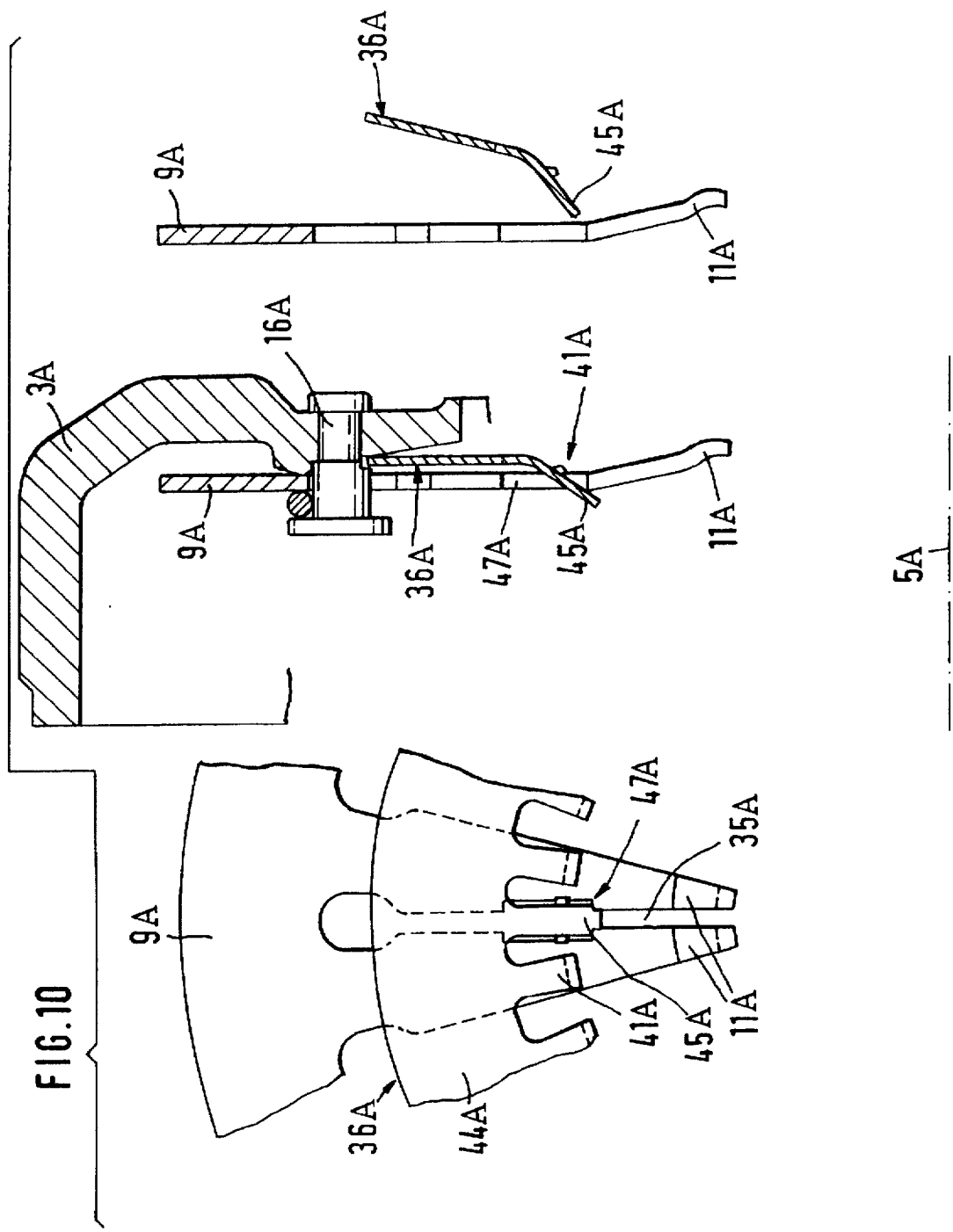

FIG. 10A, in the middle illustration, shows a section through the upper half of a friction clutch with the clutch housing 3A, membrane spring 9A and spacer bolts 16A which keep the membrane spring 9A fixed in place. The membrane spring/plate spring 36A is shown as being located between the flexible tabs 11A of the membrane spring 9A which point radially outward and the clutch housing 3A. By means of the outside diameter of its spring body 44A, the membrane spring/plate spring 36A is held in place axially and radially on the clutch housing 3A and on the spacer bolt 16A. It extends by means of its spring body radially inward, where it makes a transition into the tabs 41A, which in the operating position as shown in the drawing are in contact with the outside of the flexible tabs 11A of the membrane spring 9A. The figure on the left shows details of the membrane spring 9A, viewed from the membrane spring 36A. The spring 36A, on the periphery between each two tabs 41A, has one or more lugs 45A which extend through respective slots 35A between two flexible tabs 11A of the membrane spring next to one another on the periphery, and are hooked into the slots. For this purpose, the corresponding flexible tabs 11A are provided with a graduated opening 47A. The peripheral length of the lugs 45A is thereby coordinated with the dimensions of the opening 47A, and when installed, the lugs surround the steps between the openings 47A and the slot 35A. The spring 36A and the membrane spring 9A are installed as shown in the drawing on the right, whereby one of the two springs, or both of them, are brought into a conical position (e.g. a relaxed position), at which time the lugs 45A are threaded into the openings 47A. When assembled, there is thus a positive interlock between the two springs, so that when the friction clutch is engaged, the spring 36A cannot inadvertently snap into its inactive position.

FIG. 11A illustrates a variant embodiment of the invention from the same perspective. The membrane spring/plate spring 37A is shown as being installed with its spring body 44A and the tabs 41A pointing radially inward between the membrane spring 9A and the clutch housing 3A, and is fixed in position by means of the spacer bolts (not shown here). In contrast to FIG. 10A, the openings 48A in the flexible tabs of the membrane spring 9A are provided with a slight widening in the radial direction, and the terminal areas of the lugs 46A are coordinated with the openings 48A, while the connection area of the spring body 44A is coordinated with the slot 35A between two flexible tabs 11A which are next to one another on the periphery. It thereby becomes possible during assembly and installation to introduce the lugs 46A through the openings 48A, and then, when the clutch is in the operating position, they can be displaced radially outward far enough so that they are hooked behind the slot 35A radially outside the opening 48A. The function of this system corresponds to that of the system illustrated in FIG. 10A.

One feature of the invention resides broadly in the friction clutch 1A, 2A in the drive train of a motor vehicle, comprising a clutch housing 3A, 4A which is fastened to a flywheel of an internal combustion engine and can rotate with the flywheel around an axis of rotation 5A, an application plate 6A, 7A which is fastened in the clutch housing 3A, 4A non-rotationally but also fastened so that it can be displaced axially, a clutch disc 8A with friction linings between the application plate 6A, 7A and the flywheel, a membrane spring 9A, 10A which is supported on one hand, on the application plate 6A, 7A and, on the other hand, on the clutch housing 3A, 4A, and which membrane spring applies pressure to the application plate 6A, 7A toward the flywheel to generate an application force A, a release element of a release system which acts on the radially inner areas of the membrane spring 9A, 10A, a device 12A which makes an automatic adjustment to compensate for wear to the friction linings, to preserve the original installed position of the membrane spring 9A, 10A and the application force A, a membrane spring/plate spring 14A, 15A, 29A, 36A, 37A which is supported on one side on a fixed or axially-fixed component 3A, 4A, and supported on the other side on another component 9A, 10A in the actuation system consisting of the application plate and release system, this membrane spring/plate spring 14A, 15A, 29A, 36A, 37A exerting little or no release force when the friction clutch is engaged, and exerting an increasing release force as the release travel increases.

Another feature of the invention resides broadly in the friction clutch characterized by the fact that the release force exerted by the membrane spring/plate spring 14A, 15A, 19A is, at no point of the release travel, greater than the force exerted by the membrane spring 9A, 10A on the release system.

Yet another feature of the invention resides broadly in the friction clutch characterized by the fact that the membrane spring/plate spring 14A, 15A is supported, on one hand, on the clutch housing 3A, 4A and, on the other hand, directly on the membrane spring 9A, 10A.

Still another feature of the invention resides broadly in the friction clutch characterized by the fact that the membrane spring/plate spring 14A, 15A is preferably located essentially radially inside the radially inward support of the membrane spring 9A, 10A.

A further feature of the invention resides broadly in the friction clutch characterized by the fact that the membrane spring/plate spring 14A, 15A is supported, in the vicinity of its two contact points, both in the direction of the force exerted by the membrane spring/plate spring 14A, 15A and in the opposite direction.

Another feature of the invention resides broadly in the friction clutch whereby, with the interposition of adjustment elements of the automatic wear adjustment device, the membrane spring is in contact against the application plate, against the application plate, in the vicinity of its outside diameter of the membrane spring; and the membrane spring is pivotably mounted, in the vicinity of an intermediate diameter of the membrane spring, on the clutch housing, characterized by the fact that the membrane spring/plate spring 14A is engaged, with its outside diameter, in recesses 19A of the spacer bolts 16A, each recess comprising a gap with respect to the inner wall of the clutch housing 3A, each gap being equal to at least the thickness of the material of the membrane spring/plate spring 14A.

Yet another feature of the invention resides broadly in the friction clutch characterized by the fact that the membrane spring/plate spring 14A, in its radially inner area, is supported on the flexible tabs 11A of the membrane springs 9A by means of a contact area 20A, and at least some of the individual flexible tabs 11A are surrounded by separate or integral retaining elements 21A for securing the flexible tabs 11A in the direction opposite the contact area.

Still another feature of the invention resides broadly in the friction clutch whereby the membrane spring is supported on the clutch housing in the vicinity of the outside diameter of the membrane spring, and is supported on the application plate, with the interposition of adjustment elements of the automatic wear adjustment device, in the vicinity of an intermediate diameter of the membrane spring, characterized by the fact that the membrane spring/plate spring 15A is engaged, with its outside diameter, in a housing gap 22A, wherein the housing gap 22A equals at least the material thickness of the membrane spring/plate spring 15A.

A further feature of the invention resides broadly in the friction clutch characterized by the fact that the membrane spring/plate spring 15A, is provided in its radially inner area, with at least some tabs 23A distributed around the periphery of the radially inner area, each tab 23A running through spaces between the flexible tabs 11A of the membrane spring 10A and being supported on the membrane spring 10A on the back side of the flexible tabs 11A.

Another feature of the invention resides broadly in the friction clutch characterized by the fact that the tabs 23A, at some distance from the back side of the flexible tabs 11A, are bent radially inward in a hook shape, and are supported on the flexible tabs 11A by means of an encircling support ring 24A.

Yet another feature of the invention resides broadly in the friction clutch characterized by the fact that the membrane spring/plate spring 15A is secured with respect to the outside of the flexible tabs 11A by means of a contact area 25A, the contact area 25A being interrupted only by the tabs 23A.

Still another feature of the invention resides broadly in the friction clutch characterized by the fact that the housing gap 22A is formed, on one hand, by the inner edge 26A of the clutch housing 4A minus the dimension of the material thickness of the membrane spring/plate spring 15A, and, on the other hand, by heads 18A of securing rivets 17A which are installed so that they project radially inward beyond the area of the reduced material thickness.

A further feature of the invention resides broadly in the friction clutch characterized by the fact that the release force exerted by the membrane spring/plate spring 14A, 15A, 29A, 30A in the terminal area of the release travel is equal to or greater than the force exerted on the release system by the membrane spring 9A, 19A.

Another feature of the invention resides broadly in the friction clutch characterized by the fact that the characteristic of the membrane spring/plate spring 30A is reduced by additional measures in the terminal area of the release travel to prevent a crossover with the characteristic of the membrane spring 9A.

Yet another feature of the invention resides broadly in the friction clutch characterized by the fact that the membrane spring 30A is in contact with the flexible tabs 11A of the membrane spring 9A by means of its inside diameter $D_i$ and with the clutch housing 4A in the vicinity of its outside diameter $D_a$, whereby the clutch housing 4A is realized so that during the transition from the released state of the friction clutch to the engaged state of the friction clutch, the contact between the membrane spring 30A and the clutch housing 4A moves from the outside diameter $D_a$ to an intermediate diameter D, the intermediate diameter D being smaller than the outside diameter $D_a$.

Still another feature of the invention resides broadly in the friction clutch characterized by the fact that the membrane spring 30A is in contact with its inside diameter $D_i$ against the flexible tabs 11A of the membrane spring 9A, and is in contact with its outside diameter $D_a$ on the clutch housing 4A, and, during the movement from the engaged state into the released state of the friction clutch, the membrane spring 30A comes in contact with the clutch housing 4A by means of an intermediate diameter D.

A further feature of the invention resides broadly in the friction clutch characterized by the fact that the membrane spring 30A is fixed in place by means of its outside diameter $D_a$ by the spacer bolts 31A which are located concentric to the axis of rotation 5A in the clutch housing 4A, and at least one of the spacer bolts 31A has an extension 32A which points radially inward, wherein the membrane spring 30A is in contact with the at least one of the spacer bolts 31A during the release process.

Another feature of the invention resides broadly in the friction clutch whereby the membrane spring is actuated by means of a hydraulic/pneumatic release system which has an axially fixed housing and an axially movable piston with a release bearing, characterized by the fact that the membrane spring 29A is in contact with the housing 33A by means of the outside diameter of the membrane spring 29A and with the piston 34A by means of the inside diameter of the membrane spring 29A.

Some examples of control devices and other systems which might be used with or in the present invention are:

U.S. Pat. No. 4,852,419, Inventors: Friedrich Kittel, Dieter Lutz, Franz Nagler, Horst Oppitz and Gerhard Gasper, Title: Control device, in particular for a motor-vehicle friction clutch; U.S. Pat. No. 5,212,380, Inventors: Seiichi Sato, Kazuo Yamaguchi, Yoshi Kurosawa, Atsushi Ueda and Masami Matsumura, Title: Automotive engine control system with rotary encoder indexing; U.S. Pat. No. 5,326,160, Inventors: John P. Bayliss and Sean Byrnes, Title: Hydraulic systems for vehicles; U.S. Pat. No. 5,307,013, Inventors: Alfred J. Santos and Michael C. Brauer, Title: Digital position sensor system for detecting automatic transmission gear modes.

Some examples of hydraulic master cylinders which may be utilized in accordance with the present invention may be found in the following U.S. Pat. Nos.: 5,211,099 entitled "Slave Cylinder for a Hydraulic Actuating System of a Motor Vehicle Friction Clutch" to Fichtel & Sachs; 5,213,187 entitled "Device Relating to a Semi-automatic Clutch for Vehicles"; 5,284,017 entitled "Hydraulic Master Cylinder" to Automotive Products; and 5,301,597 entitled "Hydraulic Cylinder" to Kugelfischer Schafer.

Some examples of clutch assemblies and various components associated therewith which could possibly utilize the present invention may be disclosed in the following U.S. Pat. Nos.: 4,684,007 to Maucher, entitled "Clutch Plate"; 4,635,780 to Wiggen, entitled "Clutch Disc for a Motor Vehicle Friction Clutch"; 4,651,857 to Schraut et al., entitled "Clutch Disc Unit for a Motor Vehicle Friction Clutch"; 5,103,688 to Kuhne, entitled "Two-mass Flywheel"; and 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. patents, each of which is assigned to the assignee of the present invention: 5,211,099 to Grosspietsch et al., dated May 18, 1993 and entitled "Slave Cylinder for a Hydraulic Actuating System of a Motor Vehicle Friction Clutch"; 5,052,279 to Limbacher and Fadler, dated Oct. 1, 1991 and entitled "Hydraulic Cylinder for a Hydraulic Actuation Arrangement of a Motor Vehicle Friction Clutch"; and 4,456,111 to Limbacher, dated Jun. 26, 1984 and entitled "Hydraulic Control System for a Clutch".

Examples of pulled or pull-type clutch arrangements, having components whic may be utilized in accordance with the embodiments of the present invention, may be found in the following U.S. Pat. Nos.: 5,183,141, which issued to Abe et al. on Feb. 2, 1993; 5,201,393, which issued to Takeuchi et al. on Apr. 13, 1993; 5,207,741, which issued to Abe on May 4, 1993; 5,318,162, which issued to Maucher et al. on Jun. 7, 1994; and 5,265,709, which issued to Takeuchi et al. on Nov. 30, 1993.

Examples of release systems, such as hydraulic release systems, for clutches, which may be utilized in accordance with the embodiments of the present invention, may be found in the following U.S. Pat. Nos.: 4,903,806, which issued to Flotow on Feb. 27, 1990; 4,924,992, which issued to Romig on May 15, 1990; 4,938,332, which issued to Thomas et al. on Jul. 3, 1990; No. 5,076,420, which issued to Kuschel on Dec. 31, 1991.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application Nos. P 195 18 065.8, filed on May 17, 1995, and P 44 46 755.9, filed on Dec. 24, 1994, having inventors Achim Link and Reinhold Weidinger, as well as Federal Republic of Germany Patent Application No. P 195 18 055.0, filed on May 17, 1995, and DE-OS 195 18 065.8, DE-OS 44 46 755.9 and DE-OS 195 18 055.0, and DE-PS 195 18 065.8, DE-PS P 44 46 755.9 and DE-PS 195 18 055.0, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a clutch housing;

a clutch disc disposed within said housing, said clutch disc defining an axis of rotation and an axial direction parallel to the axis of rotation;

a pressure plate for engaging and disengaging said clutch disc with a flywheel of an internal combustion engine;

said clutch housing being fixedly attached to the flywheel so as to allow simultaneous rotation of said clutch housing and the flywheel around the axis of rotation;

an actuation system comprising means for biasing said pressure plate;

said actuation system comprising a membrane spring;

said clutch disc comprising friction linings;

said friction linings being disposed between said pressure plate and the flywheel;

means for making an automatic adjustment to compensate for wear to said friction linings and for substantially maintaining the axial distance and biasing force between said pressure plate and said membrane spring;

a substantially disc-shaped spring having a first side and a second side disposed opposite one another;

said substantially disc-shaped spring comprising at least a disc portion;

a substantially fixed component;

said first side of said disc-shaped spring being supported by said substantially fixed component;

said second side of said disc-shaped spring being supported by said actuation system;

said actuation system having a release travel distance during the disengaging of said friction clutch;

said substantially disc-shaped spring providing means for providing a first release force upon the engagement of said friction clutch with the flywheel; and said providing means providing a second release force which increases in magnitude from an engaged position to at least a fully disengaged position as the release travel distance of said actuation system increases during the disengagement of said friction clutch with the flywheel, said second release force being greater than said first release force.

2. The friction clutch according to claim 1, wherein:

said actuation system comprises a release system;

said membrane spring provides means for providing a force on said release system; and said force being at all times greater in magnitude than said second release force.

3. The friction clutch according to claim 2, wherein:

said substantially disc-shaped spring is supported on said second side by said membrane spring; and said substantially fixed component comprises said clutch housing.

4. The friction clutch according to claim 3, wherein:

said membrane spring has an outside diameter and an inside diameter;

said outside diameter being farther from said axis of rotation than said inside diameter;

said clutch comprises means for supporting said membrane spring;

said support means is disposed between said outside diameter and said inside diameter; and said substantially disc-shaped spring is disposed substantially radially inward of said support means.

5. The friction clutch according to claim 4, wherein:

said substantially-disc shaped spring is supported in at least two directions; and said at least two directions comprise support: in the direction of said first and second release forces, and in a direction opposite to said first and second release forces.

6. The friction clutch according to claim 5, wherein:

said membrane spring is in contact with said automatic adjustment means and is operatively connected to said pressure plate at a point adjacent said outside diameter of said membrane spring;

said membrane spring has an intermediate diameter disposed between said outside diameter and said inside diameter;

said clutch further comprises:

means for pivotably mounting said membrane spring on said clutch housing, adjacent said intermediate diameter;

said pivotable mounting means comprises a plurality of spacer bolts disposed concentrically about said axis of rotation;

said substantially-disc shaped spring has an inside diameter and an outside diameter;

said clutch housing having an inner surface facing said pressure plate;

at least some of said spacer bolts each have a recess;

each of said recesses define a gap between a corresponding one of said spacer bolts and said inner surface of said clutch housing;

said substantially disc-shaped spring having a thickness defined parallel to the axis of rotation;

each of said gaps being at least equal in diameter to said thickness;

said disc-shaped spring having an end portion adjacent said outside diameter of said disc-shaped spring; and at least a part of said end portion being disposed in each of said gaps.

7. The friction clutch according to claim 6, wherein:

said membrane spring comprises a plurality of flexible tab elements extending radially inward;

said flexible tab elements comprises a contact area;

said contact area providing support in a first direction to said substantially disc-shaped spring adjacent said inside diameter of said substantially disc-shaped spring;

said clutch further comprises a plurality of retaining elements disposed one of: between and about, at least some of said flexible tab elements;

said retaining elements securing together said flexible tab elements and said substantially disc-shaped spring substantially adjacent said inner diameter of said substantially disc-shaped spring;

said retaining elements providing support in a second direction; and said first direction being opposite said second direction.

8. The friction clutch according to claim 5, wherein:

said membrane spring is supported adjacent said outside diameter of said membrane spring on said clutch housing;

said membrane spring is supported adjacent said intermediate diameter by said pressure plate and said automatic adjustment means;

said substantially-disc shaped spring has an inside diameter and an outside diameter;

said outside diameter being farther from said axis of rotation than said inside diameter;

said clutch housing comprises an annular end portion adjacent said intermediate diameter of said membrane spring;

said annular end portion comprises an outer surface facing away from said pressure plate;

said annular end portion comprises a gap disposed in said outside surface;

said substantially disc-shaped spring having a thickness defined parallel to said axis of rotation;

said gap is at least equal in diameter to said thickness;

said disc-shaped spring having an end portion adjacent said outside diameter of said disc-shaped spring; and said end portion is fixedly engaged in said gap.

9. The friction cluch according to claim 8, wherein:

said membrane spring comprises a plurality of flexible tab elements extending radially inward;

said flexible tab elements having an inner surface facing said pressure plate;

said flexible tab elements defining openings between two adjacent ones of said flexible tab elements;

said substantially disc-shaped spring comprises at least some tab portions extending axially inward, into and beyond at least some of said openings; and said clutch further comprises means for supporting said tabs on said inner surface of said flexible tab elements.

10. The friction clutch according to claim 9, wherein:

said tabs comprise bent areas disposed axially inward of said inner surfaces of said flexible tab elements;

said bent areas being bent radially inward to form a hook shape;

said means for supporting said tabs comprises a support ring; and said support ring being disposed between said bent areas and said inner surfaces of said flexible tab elements.

11. The friction clutch according to claim 9, wherein:

said substantially disc-shaped spring and said outer surfaces of said flexible tab elements form a substantially continuous contact area;

said substantially disc-shaped spring and said outer surfaces of said flexible tab elements being secured to one another at said substantially continuous contact area; and said contact area being interrupted only by said tab portions.

12. The friction clutch according to claim 8, wherein:

said clutch housing comprises a plurality of securing rivets disposed concentrically about said axis of rotation;

said securing rivets being disposed radially outwardly from, and immediately adjacent to, said gap in said clutch housing;

said securing rivets comprising head portions disposed on said outer surface of said clutch housing;

a portion of said head portions extending radially inward and over said gap in said clutch housing; and said portions of said rivet head portions define an outside diameter of said gap, and said outside surface of said clutch housing defines an inner diameter of said gap.

13. The friction clutch accordin to claim 1, wherein:

said actuation system comprises a release system;

said membrane spring provides means for providing a force on said release system;

said second release force of said substantially disc-shaped spring having a magnitude during the terminal movement of said release travel distance of said actuation system; and said second release force during said terminal movement is one of: equal and greater, than said membrane spring force.

14. The friction clutch according to claim 1, further comprising means for reducing a spring characteristic of said substantially disc-shaped spring during the terminal movement of said release travel distance of said actuation system; and said reducing means providing means for preventing a crossover of the spring characteristic of said substantially disc-shaped spring with a spring characteristic of said membrane spring.

15. The friction clutch according to claim 14, wherein:

said membrane spring comprises flexible tab elements extending radially inward;

said substantially disc-shaped spring having an inside diameter and an outside diameter, said outside diameter being farther from said axis of rotation than said inside diameter;

said substantially disc-shaped spring having an intermediate diameter disposed between said outside diameter and said inside diameter;

said reducing means comprises:

said substantially disc-shaped spring contacting said flexible tab elements of said membrane spring adjacent said inside diameter; and said clutch housing being configured such that said substantially disc-shaped spring contacts said clutch housing adjacent said outside diameter in the engaged state of said friction clutch, and during transition from said engaged state to a disengaged state of said friction clutch, said substantially disc-shaped spring contacts said clutch housing at said intermediate diameter.

16. The friction clutch according to claim 14, wherein:

said clutch further comprises a plurality of spacer bolts disposed concentrically about said axis of rotation;

said spacer bolts attaching said membrane spring to said clutch housing, adjacent said outside diameter of said membrane spring;

at least one of said spacer bolts comprising an additional portion extending radially inward;

said substantially-disc shaped spring contacting said at least one spacer bolt during the disengagement release travel movement of said clutch.

17. The friction clutch according to claim 1, wherein:

said clutch comprises a hydraulic-pneumatic release system for actuating said membrane spring;

said release system comprising an axially fixed housing and an axially movable piston including a release bearing;

said membrane spring having an inside diameter and an outside diameter;

said outside diameter being farther from said axis of rotation than said inside diameter;

said substantially disc-shaped spring being in contact at said outside diameter with said axially fixed housing; and said substantially disc-shaped spring being in contact at said inside diameter with said piston.

18. A friction clutch for a motor vehicle, said friction clutch comprising:

a clutch housing;

a clutch disc disposed within said housing;

a pressure plate for engaging and disengaging said clutch disc with a flywheel of an internal combustion engine;

an actuation system comprising means for biasing said pressure plate;

said actuation system comprising a membrane spring;

said clutch disc comprising friction linings;

said friction linings being disposed between said pressure plate and the flywheel of an internal combustion engine;

means for making an automatic adjustment to compensate for wear to said friction linings;

a substantially disc-shaped spring having a first end and a second end disposed opposite one another;

said first end being fixedly attached to said clutch housing;

said second end being disposed to abut said membrane spring;

said actuating system having a release travel distance during the disengaging of said friction clutch from the flywheel;

said substantially disc-shaped spring providing means for providing a first release force upon the engagement of said friction clutch with the flywheel; and said providing means providing a second release force, which second release force increases in magnitude as the release travel distance of said actuation system increases during the disengagement of said friction clutch from the flywheel, the second release force being greater than the first release force.

19. A friction clutch for a motor vehicle, said friction clutch comprising:

a clutch housing;

a clutch disc disposed within said housing;

a pressure plate for engaging and disengaging said clutch disc with a flywheel of an internal combustion engine;

said clutch disc comprising friction linings;

said friction linings being disposed between said pressure plate and the flywheel of an internal combustion engine;

means for making an automatic adjustment to compensate for wear to said friction linings;

an actuation system comprising means for biasing said pressure plate;

said actuation system comprising a membrane spring and a release system;

said release system comprising a substantially disc-shaped spring;

said actuating system having a release travel distance during the disengaging of said friction clutch from the flywheel;

said substantially disc-shaped spring providing means for providing a first release force upon the engagement of said friction clutch with the flywheel; and said providing means providing a second release force, which second release force increases in magnitude as the release travel distance of said actuation system increases during the disengagement of said friction clutch from the flywheel, the second release force being greater than the first release force.

* * * * *

UNITED STATES PATENT AND TRADEMARK OFFICE
CERTIFICATE OF CORRECTION

PATENT NO. : 5,715,921  
DATED : February 10, 1998  
INVENTOR(S) : Achim LINK and Reinhold WEIDINGER Page 1 of 8

It is certified that error appears in the above-identified patent and that said Letters Patent is hereby corrected as shown below:

In column 4, line 24, after 'FIG.', delete "1A" and insert --1--.

In column 4, line 25, after 'FIG.', delete "2A" and insert --2--.

In column 4, line 27, after the first occurrence of 'FIG.', delete "3A" and insert --3--.

in column 4, line 27, after the second occurrence of 'FIG.', delete "2A;" and insert --2;--.

In column 4, line 28, after 'FIG.', delete "4A" and insert --4--.

UNITED STATES PATENT AND TRADEMARK OFFICE
CERTIFICATE OF CORRECTION

PATENT NO. : 5,715,921

DATED : February 10, 1998

INVENTOR(S) : Achim LINK and Reinhold WEIDINGER

It is certified that error appears in the above-identified patent and that said Letters Patent is hereby corrected as shown below:

In column 4, line 30, after 'FIG.', delete "5A" and insert --5--.

In column 4, line 34, after 'FIGS.', delete "6A and 7A" and insert --6 and 7--.

In column 4, line 37, after 'FIG.', delete "8A" and insert --8--.

In column 4, line 39, after 'FIG.', delete "9A" and insert --9--.

In column 4, line 40, after 'FIGS.', delete "5A to 8A;" and insert --5 to 8;--.

In column 4, line 41, after 'FIGS.', delete "10A and 11A" and insert --10 and 11--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER Page 3 of 8

It is certified that error appears in the above-identified patent and that said Letters Patent is hereby corrected as shown below:

In column 4, line 47, after 'FIG.', delete "1A" and insert --1--.

In column 5, line 36, after 'FIG.', delete "4A" and insert --4--.

In column 5, line 54, after 'FIG.', delete "4A," and insert --4,--.

In column 6, line 25, after 'FIGS.', delete "1A and 4A" and insert --1 and 4--.

In column 6, line 33, after 'FIG.', delete "4A," and insert --4,--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER It is certified that error appears in the above-identified patent and that said Letters Patent is hereby corrected as shown below:

In column 6, line 48, after 'FIG.', delete "1A," and insert --1,--.

In column 7, line 4, after 'FIG.', delete "2A" and insert --2--.

In column 7, line 21, after 'FIG.', delete "1A." and insert --1.--.

In column 7, line 45, after 'FIG.', delete "3A." and insert --3.--.

In column 7, line 50, after 'FIGS.', delete "2A and 3A" and insert --2 and 3--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER It is certified that error appears in the above-identified patent and that said Letters Patent is hereby corrected as shown below:

In column 7, line 52, after 'FIG.', delete "1A," and insert --1,--.

In column 7, line 53, after 'FIG.', delete "4A." and insert --4.--.

In column 7, line 66, after 'FIG.', delete "5A" and insert --5--.

In column 7, line 67, after 'FIGS.', delete "1A to 3A," and insert --1 to 3,--.

In column 8, line 22, after 'FIGS.', delete "1A and 2A" and insert --1 and 2--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER It is certified that error appears in the above-identified patent and that said Letters Patent is hereby corrected as shown below:

In column 8, line 26, after 'FIGS.", delete "6A and 7A" and insert --6 and 7--.

In column 8, line 51, after 'diameter', delete " D' " and insert --D--.

In column 8, line 55, after 'diameter', delete " D' " and insert --D--.

In column 8, line 57, after 'FIG.', delete "7A," and insert --7,--.

In column 8, line 59, after 'FIG.', delete "9A:" and insert --9:--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER It is certified that error appears in the above-identified patent and that said Letters Patent is hereby corrected as shown below:

In column 8, line 61, after 'FIG.', delete "4A." and insert --4.--.

In column 9, line 15, after 'FIG.', delete "8A" and insert --8--.

In column 9, line 43, after 'FIGS.', delete "6A to 9A" and insert --6 to 9--.

In column 9, line 46, after 'FIG.', delete "5A." and insert --5.--.

In column 9, line 52, after 'FIG.', delete "10A," and insert --10,--.

UNITED STATES PATENT AND TRADEMARK OFFICE
CERTIFICATE OF CORRECTION

PATENT NO. : 5,715,921
DATED : February 10, 1998
INVENTOR(S) : Achim LINK and Reinhold WEIDINGER It is certified that error appears in the above-identified patent and that said Letters Patent is hereby corrected as shown below:

In column 10, line 18, after 'FIG.', delete "11A" and insert --11--.

In column 10, line 24, after 'FIG.', delete "10A," and insert --10,--.

In column 10, line 37, delete "10A." and insert --10.--.

Signed and Sealed this

Nineteenth Day of October, 1999

Attest:

Attesting Officer

Q. TODD DICKINSON

Acting Commissioner of Patents and Trademarks